(12) United States Patent
Hsieh (10) Patent No.: US 10,168,951 B2
(45) Date of Patent: Jan. 1, 2019

(54) METHODS FOR ACCESSING DATA IN A CIRCULAR BLOCK MODE AND APPARATUSES USING THE SAME

(71) Applicant: Silicon Motion, Inc., Jhubei, Hsinchu County (TW)

(72) Inventor: Chao-Kuei Hsieh, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 155 days.

(21) Appl. No.: 15/082,163

(22) Filed: Mar. 28, 2016

(65) Prior Publication Data

US 2016/0328183 A1 Nov. 10, 2016

(30) Foreign Application Priority Data

May 7, 2015 (TW) .............................. 104114540 A (51) Int. Cl.
  *G06F 12/02* (2006.01)
  *G06F 3/06* (2006.01)
  *G06F 12/1009* (2016.01)

(52) U.S. Cl.
  CPC .......... *G06F 3/0659* (2013.01); *G06F 3/0604* (2013.01); *G06F 3/0653* (2013.01); *G06F 3/0685* (2013.01); *G06F 12/0246* (2013.01); *G06F 12/1009* (2013.01); *G06F 2212/1044* (2013.01); *G06F 2212/2022* (2013.01)

(58) Field of Classification Search
  CPC ........................................... G06F 12/00–12/16
  See application file for complete search history.

(56) References Cited

U.S. PATENT DOCUMENTS

| 8,433,844 | B2 | 4/2013 | Lin |
| 2005/0144368 | A1 | 6/2005 | Chung et al. |
| 2011/0055460 | A1 | 3/2011 | Chen et al. |
| 2011/0072195 | A1 | 3/2011 | Lin |
| 2011/0072199 | A1* | 3/2011 | Reiter ............... G06F 13/14 711/103 |
| 2014/0095827 | A1 | 4/2014 | Wei et al. |

FOREIGN PATENT DOCUMENTS

| CN | 1637721 A | 7/2005 |
| TW | I409632 | 9/2013 |
| TW | I421869 | 1/2014 |
| TW | I438630 | 5/2014 |
| TW | I450271 | 8/2014 |
| TW | I459198 | 11/2014 |

* cited by examiner

*Primary Examiner* — Nicholas J Simonetti
(74) *Attorney, Agent, or Firm* — McClure, Qualey & Rodack, LLP (57) ABSTRACT

A method for accessing data in a circular block mode, executed by a processing unit, is introduced to contain the following steps. A read command and an LBA (Logical Block Address) are obtained from a host device through a first access interface. Logical block and page numbers are calculated according to the LBA, and a record associated with the logical block number is read from a storage mapping table, where the record contains a physical block number and a circular index. A physical page number is calculated according to the logical page number and the circular index. A read command is issued to a storage unit through a second access interface for reading data of the LBA from a region associated with the physical block number and the physical page number, and the data is replied to the host device through the first access interface.

15 Claims, 10 Drawing Sheets

METHODS FOR ACCESSING DATA IN A CIRCULAR BLOCK MODE AND APPARATUSES USING THE SAME

CROSS REFERENCE TO RELATED APPLICATIONS

This Application claims priority of Taiwan Patent Application No. 104114540, filed on May 7, 2015, the entirety of which is incorporated by reference herein.

BACKGROUND

Technical Field

The present invention relates to flash memory, and in particular to methods for accessing data in a circular block mode and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Since the NAND flash device operates in a block mode, a processing unit may program continuous data (that is, data of a series of LBA—logical block addresses) into a whole block. However, when partial data with specified LBA(s) of the block has been deleted and is then reprogrammed in replacement, it takes time for the processing unit to search for a new block of the NAND flash device and reprogram the other available data into the new block in advance. Accordingly, what is needed are methods for accessing data in a circular block mode and apparatuses that use these methods to address the aforementioned drawbacks.

BRIEF SUMMARY

An embodiment of a method for accessing data in a circular block mode, executed by a processing unit, is introduced to contain at least the following steps. A write command, an LBA, and data are obtained through a first access interface. A logical block number and a logical page number are calculated according to the LBA, and a record associated with the logical block number is read from a storage mapping table, where the record contains a first physical block number and a circular index. An actual page number is calculated according to the logical page number and the circular index. It is determined whether the first data can be stored in a first region associated with the first physical block number and the actual page number. When the data cannot be stored in the first region associated with the first physical block number and the actual page number, a second physical block number is obtained through a second access interface and a program instruction is issued to a storage unit through the second access interface to program the data into a second region from page 0 of a block associated with the second physical block number.

An embodiment of the invention introduces an apparatus for accessing data in a circular block mode including at least a first access interface coupled to a host device, a second access interface coupled to a storage unit, and a processing unit. The processing unit, coupled to the first access interface and the second access interface, obtains a write command, an LBA and data through the first access interface, calculates a logical block number and a logical page number according to the LBA, reads a record associated with the logical block number from a storage mapping table, where the record comprises a first physical block number and a circular index, calculates an actual page number according to the logical page number and the circular index, and determines whether the first data can be stored in a first region associated with the first physical block number and the actual page number. When the data cannot be stored in the first region associated with the first physical block number and the actual page number, the processing unit obtains a second physical block number through the second access interface and issues a program instruction to the storage unit through the second access interface to program the data into a second region from page 0 of a block associated with the second physical block number.

An embodiment of a method for accessing data in a circular block mode, executed by a processing unit, is introduced to contain at least the following steps. A read command and an LBA are obtained from a host device through a first access interface. A logical block number and a logical page number are calculated according to the LBA, and a record associated with the logical block number is read from a storage mapping table, where the record contains a physical block number and a circular index. A physical page number is calculated according to the logical page number and the circular index. A read command is issued to a storage unit through a second access interface for reading data of the LBA from a region associated with the physical block number and the physical page number, and the data is replied to the host device through the first access interface.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
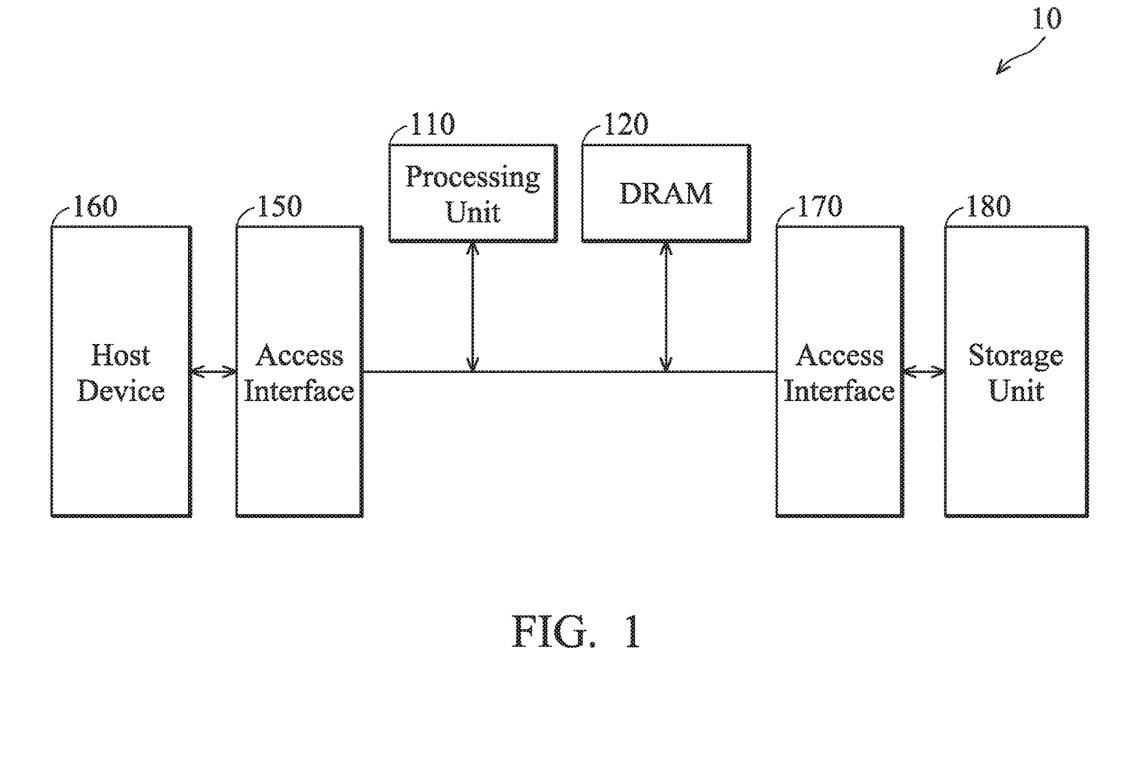
FIG. 1 is the system architecture of a flash memory according to an embodiment of the invention.

FIG. 1 is the system architecture of a flash memory according to an embodiment of the invention. The system architecture 10 of the flash memory contains a processing unit 110 configured to write data into a designated address of a storage unit 180, and read data from a designated address thereof. Specifically, the processing unit 110 programs data into a designated address of the storage unit 180 through an access interface 170 and reads data from a designated address thereof through the same interface 170. The system architecture 10 uses several electrical signals for coordinating commands and data transfer between the processing unit 110 and the storage unit 180, including data lines, a clock signal, and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using an SDR (Single Data Rate) protocol or a DDR (Double Data Rate) protocol, such as ONFI (open NAND flash interface), DDR toggle, or others. The processing unit 110 may communicate with other electronic devices through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
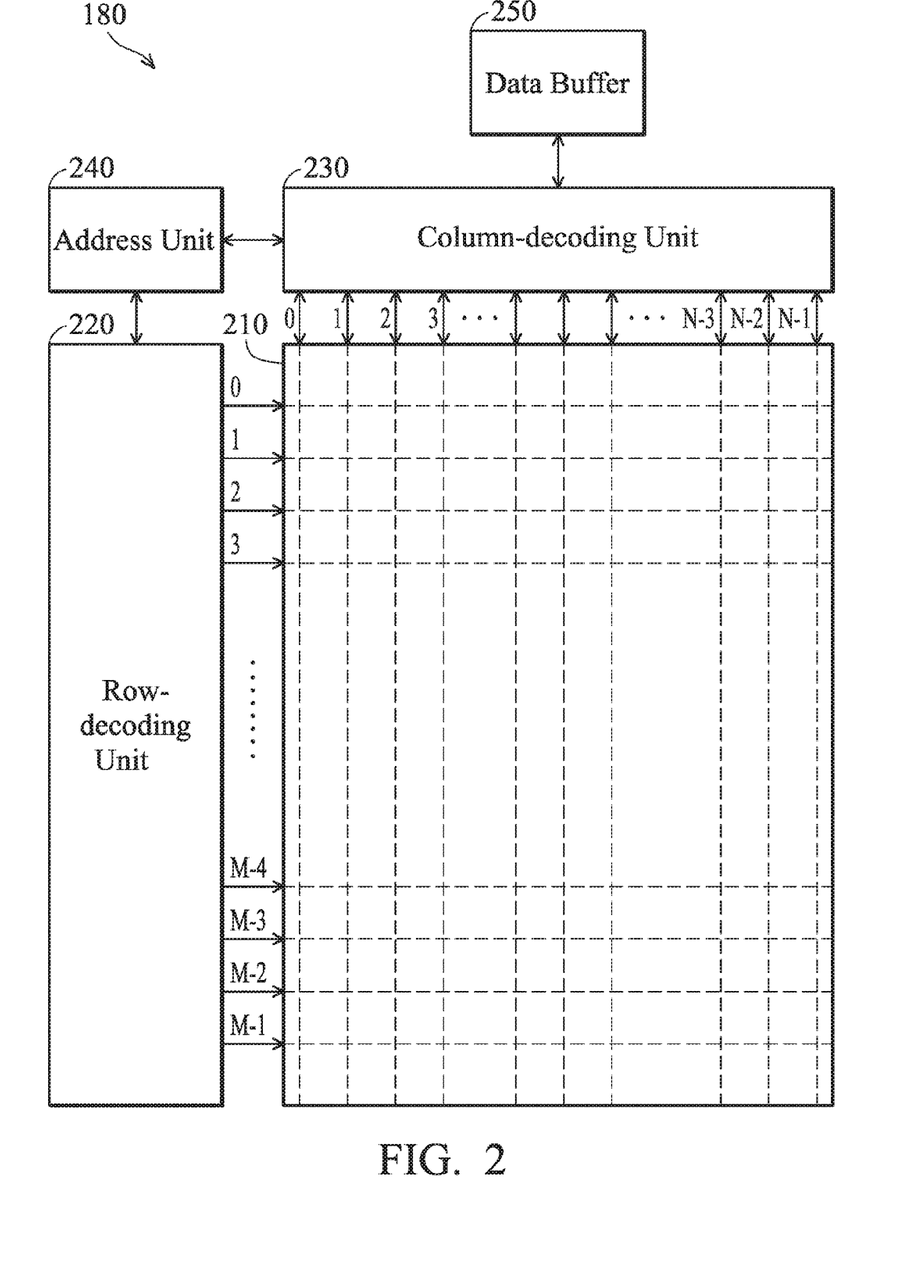
FIG. 2 shows a schematic diagram depicting a storage unit of a flash memory according to an embodiment of the invention.

FIG. 2 shows a schematic diagram depicting a storage unit of a flash memory according to an embodiment of the invention. A storage unit 180 includes an array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

Figure 3A:
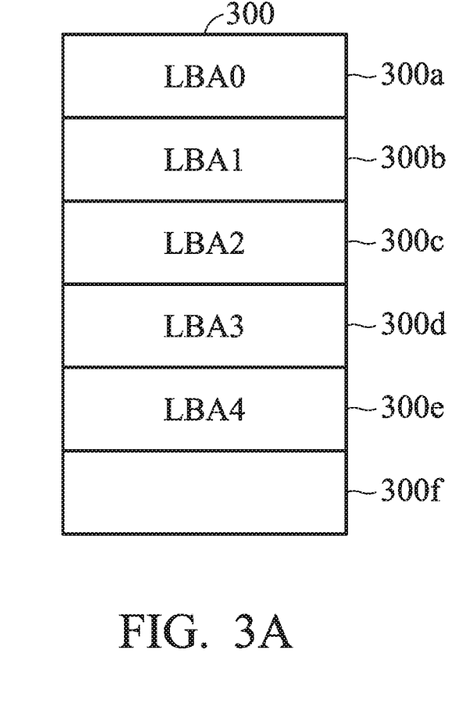
FIGS. 3A and 3B are schematic diagrams of a block of a storage unit at different moments according to an embodiment of the invention.
Figure 3B:
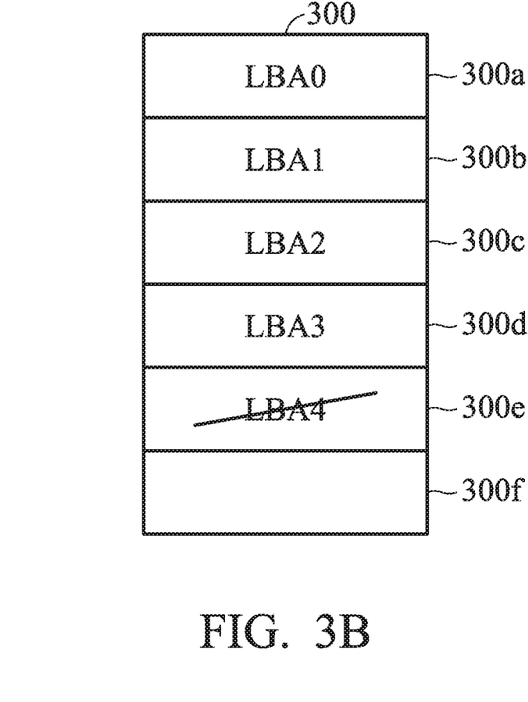
Figure 4:
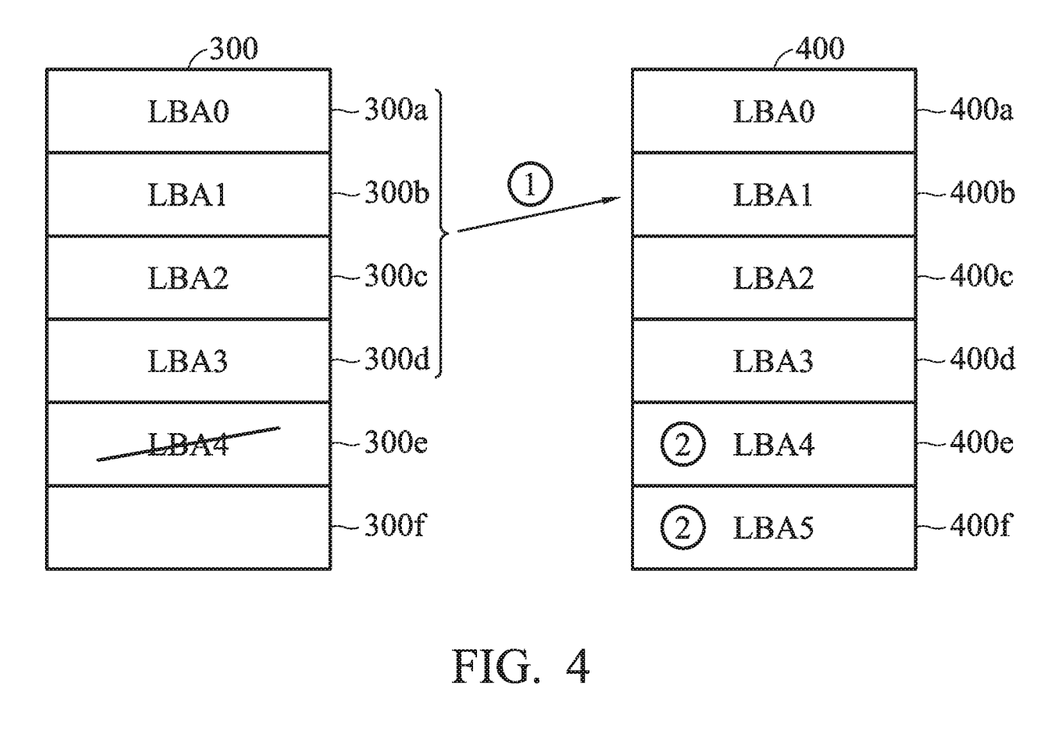
FIG. 4 is a schematic diagram illustrating data programming in the block mode according to an embodiment of the invention.
Figure 5:
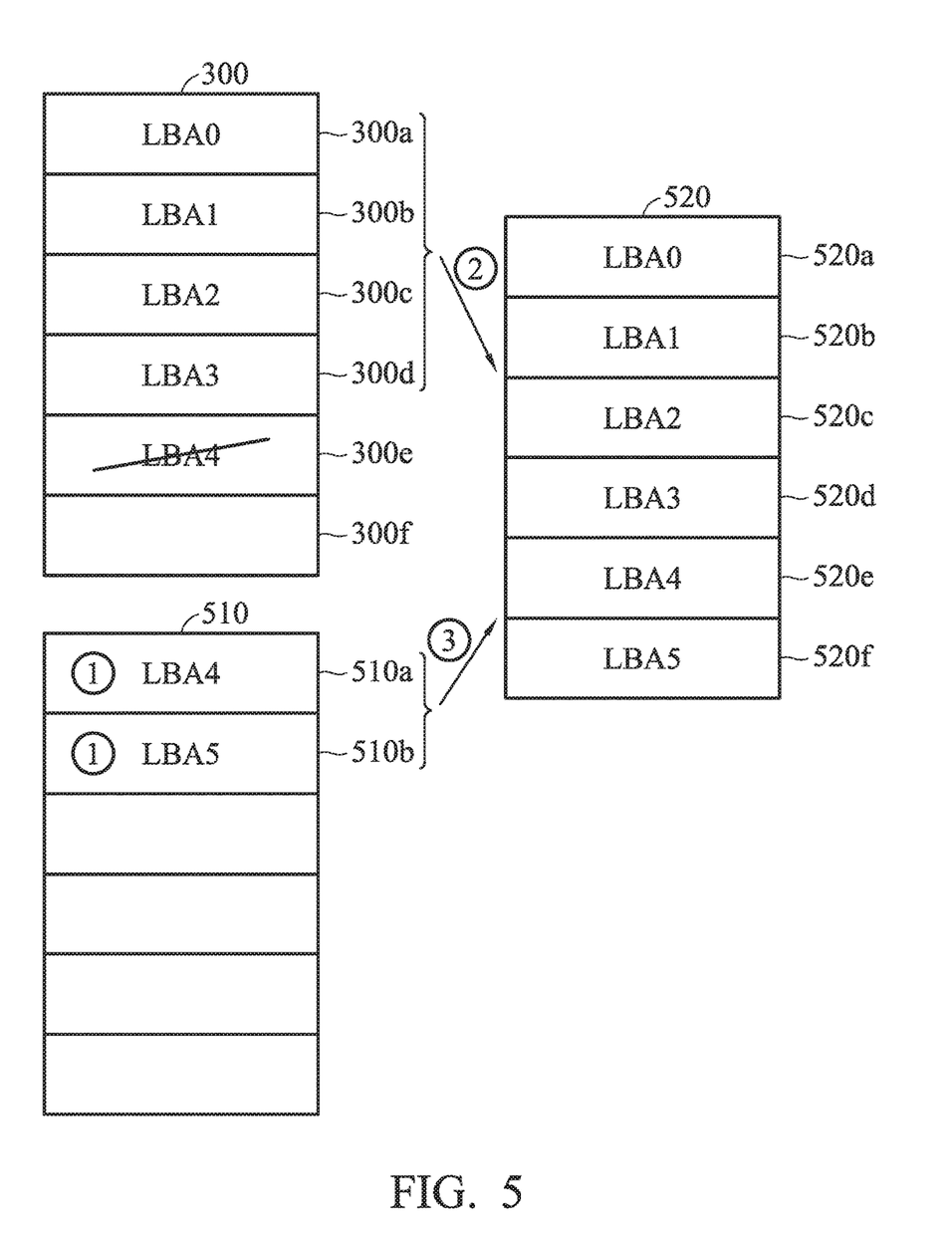
FIG. 5 is a schematic diagram illustrating data programming in the block mode according to an embodiment of the invention.

A host device 160 may provide an LBA (Logical Block Address) to the processing unit 110 through the access interface 150 to indicate a particular region for data to be read from or written into. In the block mode, a block of the storage unit 180 is allocated to store data of successive logical blocks. FIGS. 3A and 3B are schematic diagrams of a block of a storage unit at different moments according to an embodiment of the invention. Refer to FIG. 3A. A block 300 is operated in the block mode and pages 300a to 300e store data of LBA0 to LBA4, respectively. Next, refer to FIG. 3B. Data of LBA4 within the page 300e is deleted. It should be noted that, although the data within the page 300e is out of date, the page 300e cannot be used until an erase operation is performed thereto. When the host device 160 attempts to write data of LBA4 and LBA5 through the access interface 150, the processing unit 110 cannot program data of LBA4 and LBA5 into the pages 300e and 300f, respectively. In the block mode, the processing unit 110 may use two methods as follows to program data of LBA4 and LBA5. FIG. 4 is a schematic diagram illustrating data programming in the block mode according to an embodiment of the invention. With the first data-programming method of the block mode, the processing unit 110 moves, through the access interface 170, data of the pages 300a to 300d to pages 400a to 400d of a new block 400, respectively. Subsequently, the processing unit 110 programs, through the access interface 170, data of LBA4 and LBA5 into the pages 400e and 400f, respectively. However, the data-programming operation for the data of LBA4 and LBA5 has to wait until the completion of the data-moving operation for the data of LBA0 to LBA3, resulting in delays in the processing unit 110 sending a message indicating completion of the data-programming operation, which is to be replied to the host device 160. FIG. 5 is a schematic diagram illustrating data programming in the block mode according to an embodiment of the invention. With the second data-programming method of the block mode, the processing unit 110 programs, through the access interface 170, the data of LBA4 and LBA5 into pages 510a and 510b of a temporary block 510, respectively. Subsequently, in idle time, the processing unit 110 moves the data of LBA0 to LBA3 to pages 520a to 520d of the new block 520, respectively, and the data of LBA4 and LBA5 of the pages 510a and 510b to pages 520e and 520f of the new block 520, respectively.

Although the second data-programming method can resolve the drawback of the delayed reply, the temporary block 510 has to be further allocated.

Figure 6:
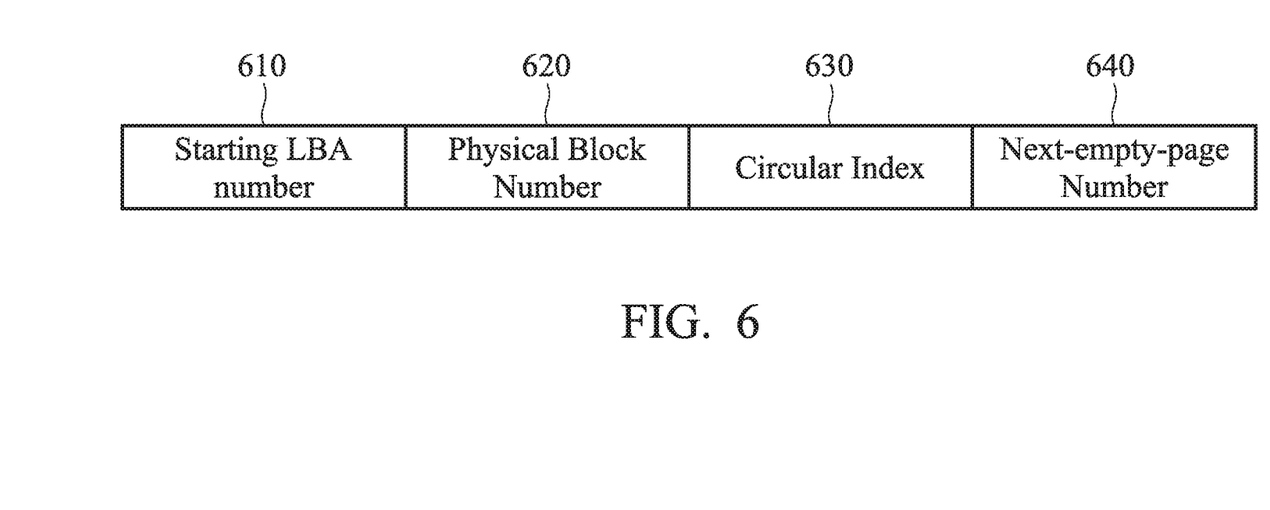
FIG. 6 is a schematic diagram depicting the data structure of a record for the circular block mode according to an embodiment of the invention.
Figure 7A:
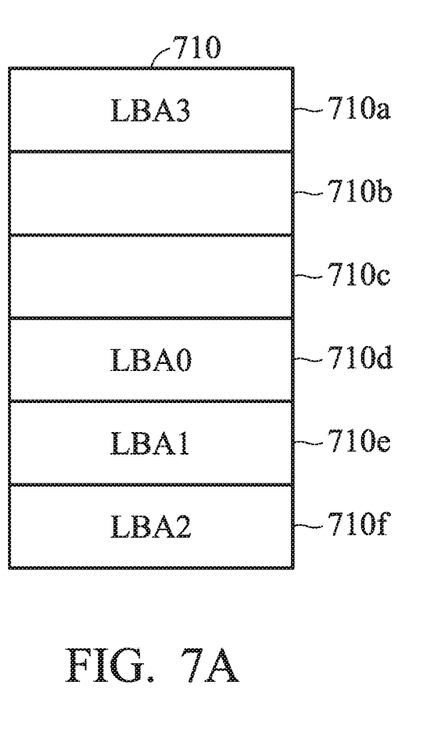
FIGS. 7A and 7B are schematic diagrams illustrating blocks of the circular block mode according to an embodiment of the invention.
Figure 7B:
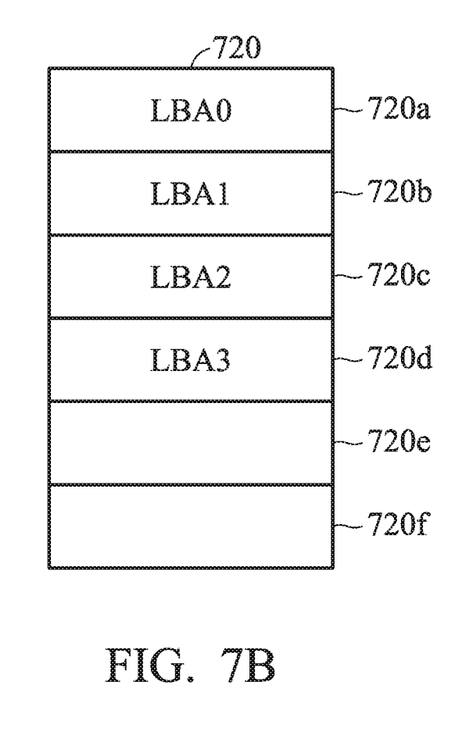

An embodiment of the invention introduces a circular block mode, thereby enabling the first page of a block to store data other than that of the minimum LBA. In order to optimize the data write efficiency, the access interface 170 distributes data with continuous LBAs across different physical regions of the storage unit 180. Thus, a storage mapping table, also referred to as an H2F (Host-to-Flash) table, is stored in a DRAM (Dynamic Random Access Memory) 120 to indicate which location in the storage unit 180 data of each LBA is physically stored in. A block may contain data of successive LBAs, and each LBA is associated with a fixed length of physical storage space, such as 256K, 512K or 1024K bytes. Although this embodiment of the invention describes an exemplary block storing data of six successive LBAs, those skilled in the art may devise the block to store more data, such as that of 128, 192, 256 LBAs, etc. The storage mapping table stores physical-location information for each block, and the physical-location information is placed in the order of the blocks. For example, the storage mapping table 300 stores physical location information from block 0 to block 1023 in sequence. FIG. 6 is a schematic diagram depicting the data structure of a record for the circular block mode according to an embodiment of the invention. For each block of the circular block mode, the storage mapping table stores a record containing four fields: a starting LBA number 610, a physical block number 620, a circular index 630 and a next-empty-page number 640. The starting LBA number 610 indicates the minimum of LBAs associated with data stored in this block, the circular index 630 indicates the LBA associated with data stored in the first page of this block, and the next-empty-page number 640 indicates the next available page number. FIG. 7A is a schematic diagram illustrating a block of the circular block mode according to an embodiment of the invention. Pages 710d to 710f and 701a of a block 710 store data of LBA0 to LBA3, respectively. The storage mapping table contains a record associated with the block 710, where the starting LBA number is 0, the circular index is 3 and the next-empty-page number is 1. FIG. 7B is a schematic diagram illustrating a block of the circular block mode according to an embodiment of the invention. Pages 720a to 720d of a block 720 store data of LBA0 to LBA3, respectively. The storage mapping table contains a record associated with the block 720, where the starting LBA number is 0, the circular index is 0 and the next-empty-page number is 4. It should be noted that the data placement for the block 720 is compatible with the data placement of the aforementioned block mode.

Figure 8:
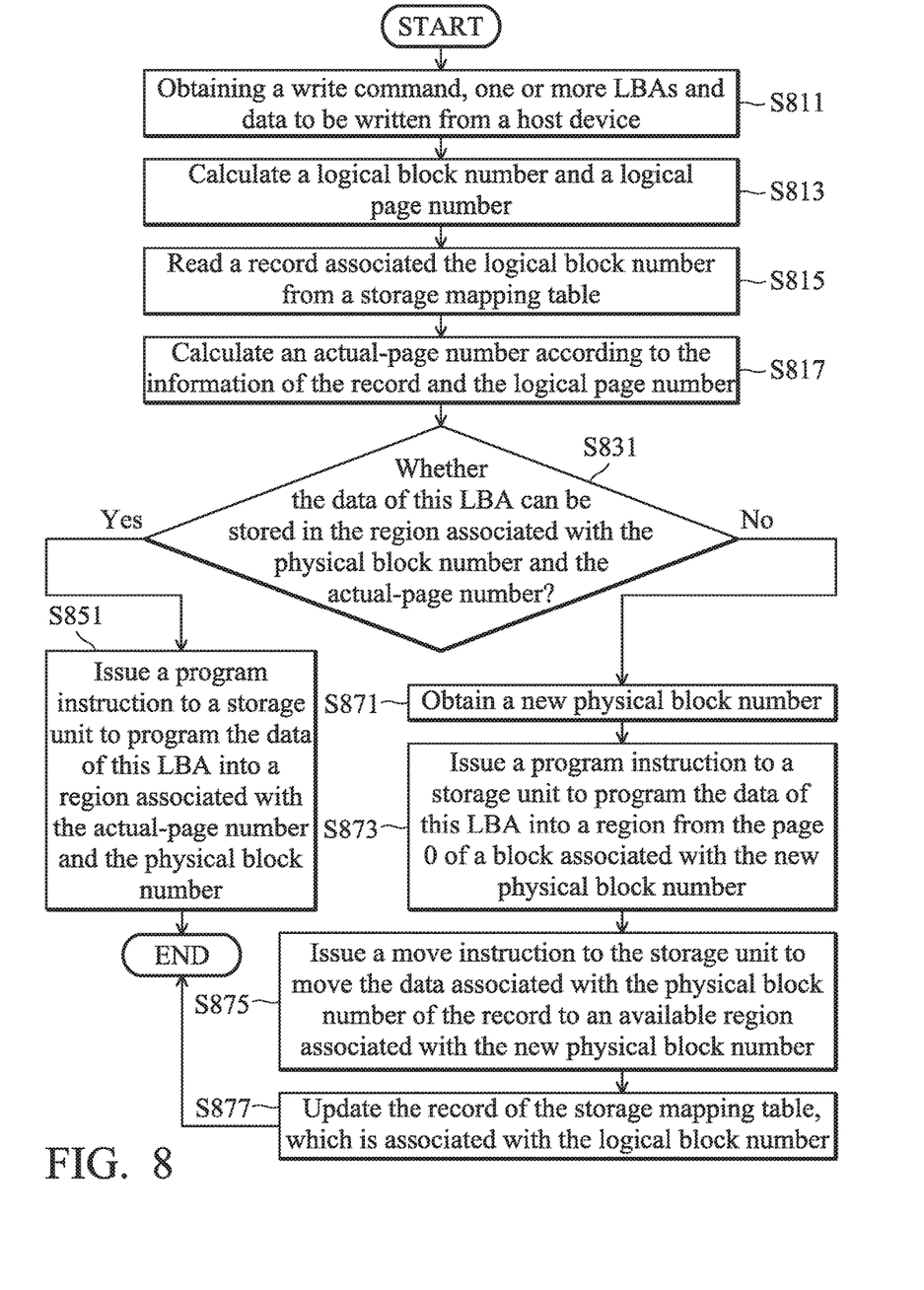
FIG. 8 is a flowchart illustrating a data-programming method, performed by a processing unit, according to an embodiment of the invention.

FIG. 8 is a flowchart illustrating a data-programming method, performed by a processing unit, according to an embodiment of the invention. After obtaining, through the access interface 150, a write command, one or more LBAs and data to be written from the host device 160 (step S811), the processing unit 110 calculates a logical block number and a logical page number (step S813). In step S813, the calculation of the logical block number and the logical page number may use an exemplary equation as follows:

$$L/n = a \ldots b \quad (1)$$

where L indicates an LBA obtained from the host device 160, n indicates a total amount of pages within one block, a indicates the logical block number and b indicates the logical page number. Assume that one block contains six pages and the received LBA is 4: The calculated logical block number is 0 and the calculated logical page number is 4. Next, a record associated with the calculated logical block number is read from a storage mapping table (step S815) and an actual page number is calculated according to the information of the record and the logical page number (step S817). In step S817, the calculation of the actual page number may use an exemplary equation as follows:

$$(b+i)/n = c \ldots d \quad (2)$$

where b indicates the logical page number calculated in step S813, i indicates a circular index of the record, n indicates a total amount of pages within one block, c indicates the calculated quotient and d indicates the calculated actual page number. Please refer to FIG. 7A. Assume that the circular index of the record is 3: The calculated actual page number is 1.

Figure 9:
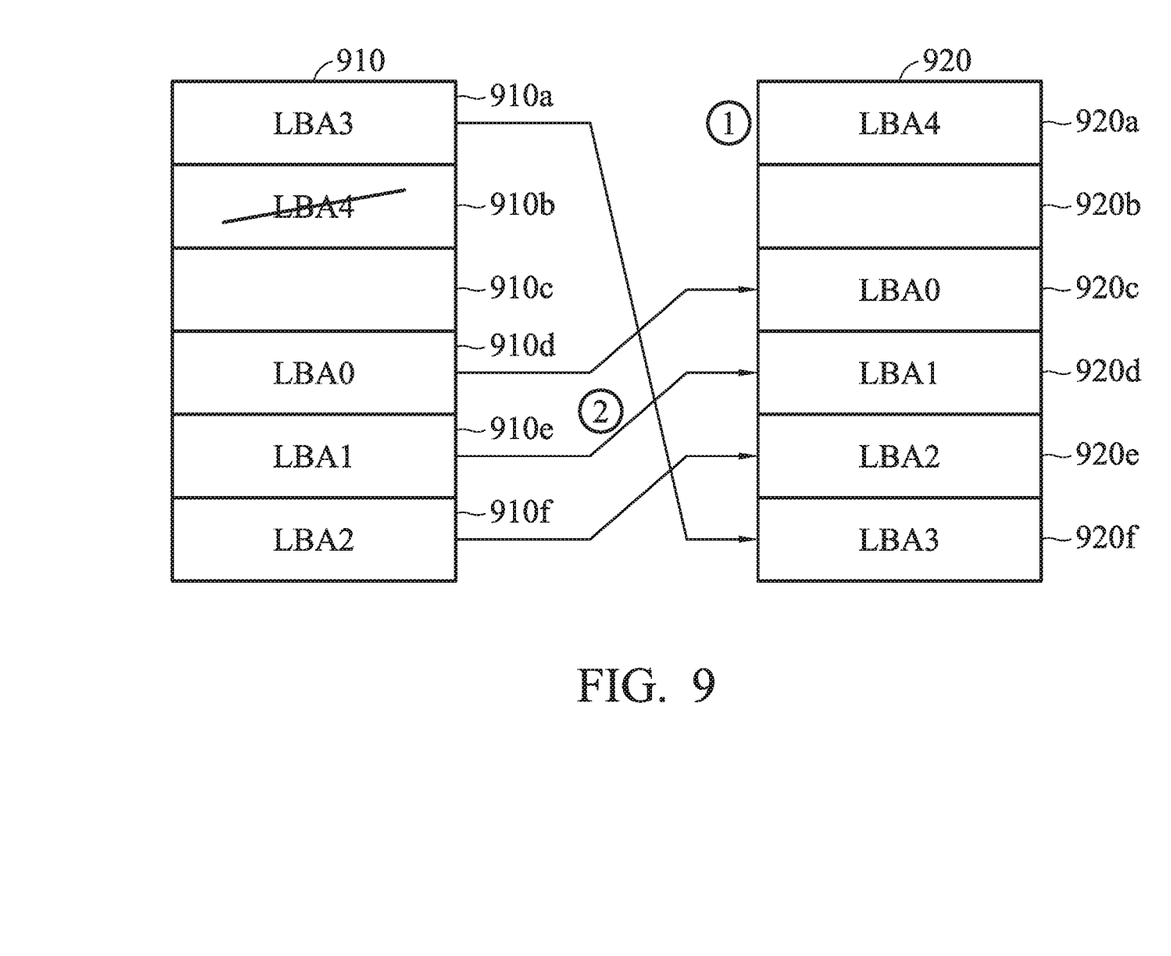
FIG. 9 is a schematic diagram illustrating data programming in the circular block mode according to an embodiment of the invention.

The processing unit 110 determines whether the data of this LBA can be stored in the region associated with the physical block number and the actual page number (step S831). In step S831, the processing unit 110 may determine whether the next-empty-page number of the record equals the actual page number calculated in step S817. If so, it is determined that the data of this LBA can be stored in the region associated with the physical block number and the actual page number; otherwise, the data of this LBA cannot be stored. When the data of this LBA can be stored in the region associated with the physical block number and the actual page number (the "Yes" path of step S831), a program instruction is issued to the storage unit 180 through the access interface 170 to program the data of this LBA into the region associated with the actual page number and the physical block number (step S851). For example, refer to FIG. 7A. Assume that the circular index of the record is 3 and the calculated actual page number is 1: The processing unit 110 instructs the storage unit 180 to program the data of LBA4 into the page 710b. When the data of this LBA cannot be stored in the region associated with the physical block number and the actual page number (the "No" path of step S831), a physical block number is newly obtained through the access interface 170 (step S871), a program instruction is issued to the storage unit 180 through the access interface 170 to program the data of this LBA into a region from the page 0 of a block associated with the obtained physical block number (step S873), a move instruction is issued to the storage unit 180 through the access interface 170 to move the data of the block associated with the physical block number of the record read in step S815 to an available region of the block associated with the physical block number newly obtained in step S871 (step S875), and the record in the storage mapping table, which is associated with the logical block number, is updated to reflect the operations of steps S873 and S875 (step S877). Another example is given as follows. FIG. 9 is a schematic diagram illustrating data programming in the circular block mode according to an embodiment of the invention. Assume that a record associated with a block 910 stores a starting LBA number being 0, a circular index being 3 and a next-empty-page number being 2: When the next-empty-page number being 2 is not equal to the calculated actual page number being 1 (the "No" path of step S831), the processing unit 110 obtains a physical block number associated with a block 920 (step S871), issues a program instruction to the storage unit 180 through the access interface 170 to store the data of LBA4 into a page 920a of the block 920 (step S873), issues a move instruction to the storage unit 180 through the access interface 170 to move data of pages 910d to 910f and 910a of the block 910 to pages 920c to 920f of the block 920, respectively (step S875), and updates a record in the storage mapping table, which is associated with a logical block number being 0, to store a starting LBA number being 0, a circular index being 4 and a next-empty-page number being 1.

Figure 10:
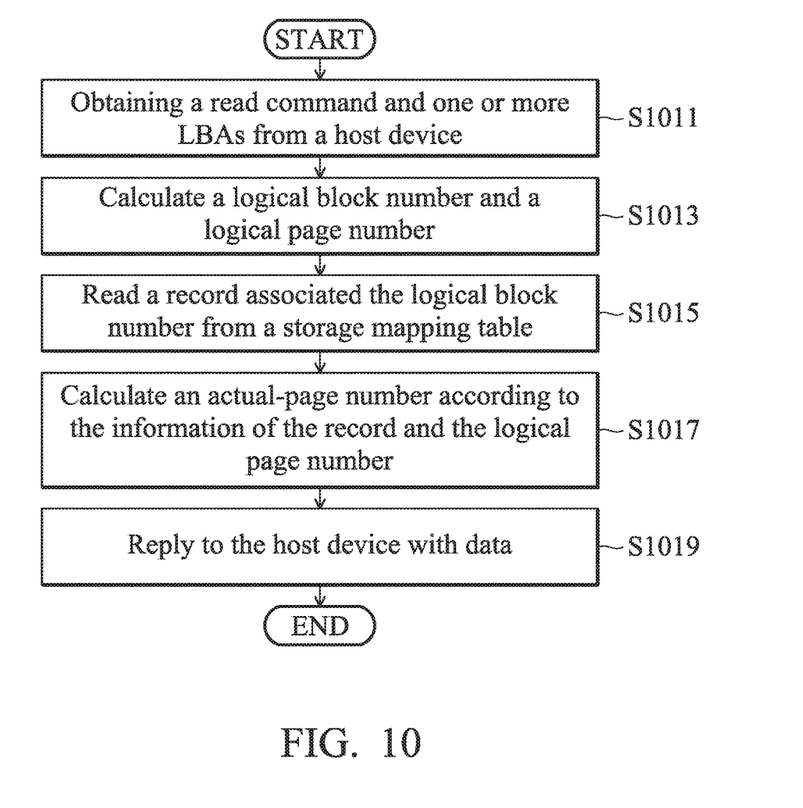
FIG. 10 is a flowchart illustrating a data-read method, performed by a processing unit, according to an embodiment of the invention.

FIG. 10 is a flowchart illustrating a data-read method, performed by a processing unit, according to an embodiment of the invention. After obtaining a read command and one or more LBAs from the host device 160 through the access interface 150 (step S1011), the processing unit 110 calculates a logical block number and a logical page number (step S1013). In step S1013, the equation (1) may be used to calculate the logical block number and the logical page number. Subsequently, a record associated with the logical block number is read from a storage mapping table (step S1015) and an actual page number is calculated according to the information of the record and the logical block number (step S1017). In step S1017, the equation (2) may be used to calculate the actual page number. A read instruction is issued to the storage unit 180 through the access interface 170 to read the data of this LBA from a region associated with the physical block number and the actual page number and the read data is replied to the host device 160 through the access interface 150 (step S1019).

Although the embodiment has been described as having specific elements in FIG. 1, it should be noted that additional elements may be included to achieve better performance without departing from the spirit of the invention. While the process flows described in FIGS. 8 and 10 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing data in a circular block mode, performed by a processing unit, comprising:
obtaining a write command, an LBA (Logical Block Address) and first data through a first access interface;
calculating a logical block number and a logical page number according to the LBA;
reading a record associated with the logical block number from a storage mapping table, wherein the record comprises a first physical block number and a circular index;
calculating an actual page number according to the logical page number and the circular index;
determining whether the first data can be stored in a first region associated with the first physical block number and the actual page number;
when the first data cannot be stored in the first region associated with the first physical block number and the actual page number, obtaining a second physical block number through a second access interface; and
when the first data cannot be stored in the first region associated with the first physical block number and the actual page number, issuing a program instruction to a storage unit through the second access interface to program the first data into a second region from page 0 of a block associated with the second physical block number;
when the first data cannot be stored in the first region associated with the first physical block number and the actual page number, issuing a move instruction to the storage unit through the second access interface to move second data associated with the first physical block number to a third region associated with the second physical block number, wherein the third region follows the second region.

2. The method of claim 1, further comprising:
when the first data cannot be stored in the first region associated with the first physical block number and the actual page number, updating the circular index of the record with the actual page number.

3. The method of claim 1, wherein the calculation of the logical block number and the logical page number uses an equation as follows:

$L/n = a$ with remainder $b$, where L indicates the LBA, n indicates a total amount of pages within one block, a indicates the logical block number and b indicates the logical page number.

4. The method of claim 1, wherein the calculation of the actual page number uses an equation as follows:

$(b+i)/n = c$ with remainder $d$, where b indicates the logical page number, i indicates the circular index, n indicates a total amount of pages within one block, c indicates the calculated quotient, and d indicates the actual page number.

5. The method of claim 1, wherein the record further comprises a next-empty-page number, and the step for determining whether the first data can be stored in a first region associated with the first physical block number and the actual page number, further comprises determining whether the next-empty-page number equals the actual page number.

6. The method of claim 5, wherein, when the next-empty-page number does not equal the actual page number, the first data cannot be stored in the first region associated with the first physical block number and the actual page number.

7. An apparatus for accessing data in a circular block mode, comprising:
a first access interface, coupled to a host device;
a second access interface, coupled to a storage unit; and
a processing unit, coupled to the first access interface and the second access interface, obtaining a write command, an LBA (Logical Block Address) and first data through the first access interface; calculating a logical block number and a logical page number according to the LBA; reading a record associated with the logical block number from a storage mapping table, wherein the record comprises a first physical block number and a circular index; calculating an actual page number according to the logical page number and the circular index; determining whether the first data can be stored in a first region associated with the first physical block number and the actual page number; and when the first data cannot be stored in the first region associated with the first physical block number and the actual page number, obtaining a second physical block number through the second access interface and issuing a program instruction to the storage unit through the second access interface to program the first data into a second region from page 0 of a block associated with the second physical block number, and issuing a move instruction to the storage unit through the second access interface to move second data associated with the first physical block number to a third region associated with the second physical block number, wherein the third region follows the second region.

8. The apparatus of claim 7, wherein, when the first data cannot be stored in the first region associated with the first physical block number and the actual page number, the processing unit updates the circular index of the record with the actual page number.

9. The apparatus of claim 7, wherein the calculation of the logical block number and the logical page number uses an equation as follows:

$L/n = a$ with remainder $b$, where L indicates the LBA, n indicates a total amount of pages within one block, a indicates the logical block number and b indicates the logical page number.

10. The apparatus of claim 7, wherein the calculation of the actual page number uses an equation as follows:

$(b+i)/n = c$ with remainder $d$, where b indicates the logical page number, i indicates the circular index, n indicates a total amount of pages within one block, c indicates the calculated quotient, and d indicates the actual page number.

11. The apparatus of claim 7, wherein the record further comprises a next-empty-page number, and the processing unit determines whether the first data can be stored in the first region associated with the first physical block number and the actual page number by determining whether the next-empty-page number equals the actual page number.

12. The apparatus of claim 11, wherein, when the next-empty-page number does not equal the actual page number, the first data cannot be stored in the first region associated with the first physical block number and the actual page number.

13. A method for accessing data in a circular block mode, performed by a processing unit, comprising:
  obtaining a read command and an LBA (Logical Block Address) from a host device through a first access interface;
  calculating a logical block number and a logical page number according to the LBA;
  reading a record associated with the logical block number from a storage mapping table, wherein the record comprises a physical block number and a circular index;
  calculating an actual page number according to the logical page number and the circular index;
  issuing a read instruction to a storage unit through a second access interface to read data of the LBA from a region associated with the physical block number and the actual page number; and
  replying to the host device through the first access interface with the data, wherein the calculation of the actual page number uses an equation as follows:

$(b+i)/n = c$ with remainder $d$, where b indicates the logical page number, i indicates the circular index, n indicates a total amount of pages within one block, c indicates the calculated quotient, and d indicates the actual page number.

14. The method of claim 13, wherein the calculation of the logical block number and the logical page number uses an equation as follows:

$L/n = a$ with remainder $b$, where L indicates the LBA, n indicates a total amount of pages within one block, a indicates the logical block number and b indicates the logical page number.

15. The method of claim 13, wherein the storage mapping table is stored in a DRAM (Dynamic Random Access Memory).

* * * * *